(12) United States Patent
Kikuchi et al.

(10) Patent No.: US 10,992,462 B2
(45) Date of Patent: Apr. 27, 2021

(54) CONCEALED-DECISION-TREE COMPUTATION SYSTEM, APPARATUS, METHOD, AND PROGRAM

(71) Applicant: NIPPON TELEGRAPH AND TELEPHONE CORPORATION, Chiyoda-ku (JP)

(72) Inventors: Ryo Kikuchi, Musashino (JP); Koki Hamada, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 294 days.

(21) Appl. No.: 16/067,237

(22) PCT Filed: Jan. 13, 2017

(86) PCT No.: PCT/JP2017/001043
§ 371 (c)(1),
(2) Date: Jun. 29, 2018

(87) PCT Pub. No.: WO2017/126434
PCT Pub. Date: Jul. 27, 2017

(65) Prior Publication Data
US 2019/0013935 A1    Jan. 10, 2019

(30) Foreign Application Priority Data
Jan. 18, 2016  (JP) .............................. JP2016-007174

(51) Int. Cl.
*H04L 9/08*  (2006.01)
*G09C 1/00*  (2006.01)
(Continued)

(52) U.S. Cl.
CPC .......... *H04L 9/085* (2013.01); *G06F 16/9027* (2019.01); *G06N 5/045* (2013.01); *G09C 1/00* (2013.01)

(58) Field of Classification Search
None
See application file for complete search history.

(56) References Cited

U.S. PATENT DOCUMENTS

| 9,787,647 B2 * | 10/2017 | Wu ....................... H04L 63/0428 |
| 2012/0159180 A1 * | 6/2012 | Chase .................. G06F 21/6227 713/183 |
| 2015/0347781 A1 * | 12/2015 | Patey ..................... H04L 9/085 726/30 |

FOREIGN PATENT DOCUMENTS

JP    2013020313    *    1/2013

OTHER PUBLICATIONS

Ivan Damgard, et al., "Scalable and Unconditionally Secure Multiparty Computation," CRYPTO 2007, Lecture Notes in Computer Science, vol. 4622, Springer, 2007, pp. 572-590.
(Continued)

*Primary Examiner* — Eleni A Shiferaw
*Assistant Examiner* — Bassam A Noaman
(74) *Attorney, Agent, or Firm* — Oblon, McClelland, Maier & Neustadt, L.L.P.

(57) ABSTRACT

A concealed-decision-tree computation system includes a user apparatus and 0th to (n−1)-th server apparatuses, where n is a predetermined positive integer. The user apparatus secret-shares data D into n shares $[D]_j$ (j=0, ..., n−1) and sends the n shares $[D]_j$ (j=0, ..., n−1) to the 0th to (n−1)-th server apparatuses, respectively. The 0th to (n−1)-th server apparatuses use the n shares $[D]_j$ (j=0, n−1) to perform secret cooperation computation to obtain n shares $[out]_0$, ..., $[out]_{n-1}$ of a value "out" corresponding to the data D in a predetermined decision tree and send the n shares
(Continued)

$[out]_0, \ldots, [out]_{n-1}$ to the user apparatus. The user apparatus uses at least k shares out of the n received shares $[out]_0, \ldots, [out]_{n-1}$ to restore the value "out" corresponding to the data D in the predetermined decision tree, where k is a predetermined integer equal to or smaller than n.

4 Claims, 3 Drawing Sheets

(51) Int. Cl.
*G06F 16/901* (2019.01)
*G06N 5/04* (2006.01)

(56) References Cited

OTHER PUBLICATIONS

Ivan Damgard, et al., "Unconditionally Secure Constant-Rounds Multi-party Computation for Equality, Comparison, Bits and Exponentiation", in TCC 2006, Lecture Notes in Computer Science, vol. 3876, 2006, pp. 285-304.
International Search Report dated Feb. 7, 2017 in PCT/JP2017/001043 filed Jan. 13, 2017.
Extended European Search Report dated Jul. 2, 2019, in Patent Application No. 17741313.5, 7 pages.

\* cited by examiner

Protocol 1 BASIC DECISION-TREE COMPUTATION
─────────────────────────────────────────────
Input:
- U: D
- $S_i$ for $i < n$: $T = (h, M, m, R, L, \{G_i\}_{i \leq m-M}, \{out_i\}_{m-M \leq i < m})$ Output: $out_j$ for some $j$ 1: $U$ computes $[D] \leftarrow$ Share($D$) and sends $[D]_j$ to $S_j$ for and $j < n$
2: for $m - M \leq i < m$ do
3:   each $j \in$ path(i) do
4:     if LR(i, j) = "right" and $G_j \in$ Comparison then
5:       $[\alpha_j] \leftarrow$ COMPPUB($[D], G_j$)
6:     if LR(i, j) = "right" and $G_j \in$ Equality then
7:       $[\alpha_j] \leftarrow$ EQPUB($[D], G_j$)
8:     if LR(i, j) = "left" and $G_j \in$ Comparison then
9:       $[\alpha'_j] \leftarrow$ COMPPUB($[D], G_j$)
10:      $[\alpha_j] := 1(-)[\alpha'_j]$
11:    if LR(i, j) = "left" and $G_j \in$ Equality then
12:      $[\alpha'_j] \leftarrow$ EQPUB($[D], G_j$)
13:      $[\alpha_j] := 1(-)[\alpha'_j]$
14:    $[flag_i] := \prod_{j \in path(i)} [\alpha_j]$ by using MULT recursively
15:  $[out] := (+)_{n-m \leq i < m} ([flag_i](\times) out_i)$
16: $S_i$ sends $[out]_i$ for $i < n$
17: $U$ obtains $out \leftarrow$ Rec($[out]_0, \ldots, [out]_{k-1}$)

FIG.3

CONCEALED-DECISION-TREE COMPUTATION SYSTEM, APPARATUS, METHOD, AND PROGRAM

TECHNICAL FIELD

The present invention relates to a technique that returns, while data is being concealed, a computation result based on the concealed data.

BACKGROUND ART

Recently, data mining or inference has been performed based on findings obtained from a number of purchase histories, to recommend an individual to buy product B when he or she bought product A. One of the methods of performing such inference uses a decision tree. A binary decision tree is taken here as an example. A decision tree is defined by a number of nodes and edges. The nodes include a layer-0 node called a root node, nodes having no node therebelow, called leaf nodes, and intermediate nodes other than the root node and the leaf nodes. The nodes other than the leaf nodes have conditional expressions that determine the transition to the left or the right at the next layer. The leaf nodes have recommended values.

To obtain a recommended value for certain data in a decision tree, it is checked whether the data satisfies the conditional expression at each node starting from the root node. If the value satisfies the conditional expression, the transition to the right is determined; otherwise, the transition to the left is determined. This processing is repeated, and the recommended value corresponding to the leaf node finally reached is the value for the data.

When a company creates a decision tree for some analysis, it is generally unreasonable for the company to make it public because the decision tree is one of the findings of the company.

These days, data on individuals has been used actively and widely, such as personal data and medical data. These pieces of data are highly confidential, and it is desirable to handle them while keeping them concealed.

It is assumed here that there are two parties, a user apparatus U and a server apparatus S. The user apparatus U has its own data; and the server apparatus S has a decision tree created based on findings and other information obtained so far from its own service.

It is further assumed in such a case that the data of the user apparatus U is used as an input, and the decision tree of the server apparatus S is used to obtain an inference result.

Because both a decision tree and data have been required until now to perform decision-tree computation, it is necessary either that the user apparatus U pass its own data to the server apparatus S or that the server apparatus S pass its decision tree to the user apparatus U.

SUMMARY OF THE INVENTION

Problems to be Solved by the Invention

However, in the former case, the server apparatus S knows the data of the user apparatus U; and in the latter case, the decision tree of the server apparatus S is passed to the user apparatus U, which means that the findings of the server apparatus S might be leaked.

An object of the present invention is to provide a concealed-decision-tree computation system, apparatus, method, and program that return to the user a computation value while keeping the data of a user apparatus and the decision tree of a server apparatus concealed from each other.

Means to Solve the Problems

A concealed-decision-tree computation system according to one aspect of the present invention includes a user apparatus and 0th to (n−1)-th server apparatuses, where n is a predetermined positive integer. The user apparatus secret-shares data D into n shares $[D]_j$ (j=0, . . . , n−1) and sends the n shares $[D]_j$ (j=0, . . . , n−1) to the 0th to (n−1)-th server apparatuses, respectively. The 0th to (n−1)-th server apparatuses use the n shares $[D]_j$ (j=0, . . . , n−1) to perform secret cooperation computation to obtain n shares $[out]_0$, . . . , $[out]_{n-1}$ of a value "out" corresponding to the data D in a predetermined decision tree and send the n shares $[out]_0$, . . . , $[out]_{n-1}$ to the user apparatus. The user apparatus uses at least k shares out of the n received shares $[out]_0$, . . . , $[out]_{n-1}$ to restore the value "out" corresponding to the data D in the predetermined decision tree, where k is a predetermined integer equal to or smaller than n.

A concealed-decision-tree computation apparatus according to one aspect of the present invention includes the 0-th to (n−1)-th server apparatuses of the concealed-decision-tree computation system.

Effects of the Invention

A computation value can be returned to the user apparatus while keeping the data of the user apparatus and the decision tree of the server apparatuses concealed from each other.

BRIEF DESCRIPTION OF THE DRAWINGS

FIG. 3 is a view showing an example of a basic decision-tree computation protocol.

DETAILED DESCRIPTION OF THE EMBODIMENTS

Figure 1:
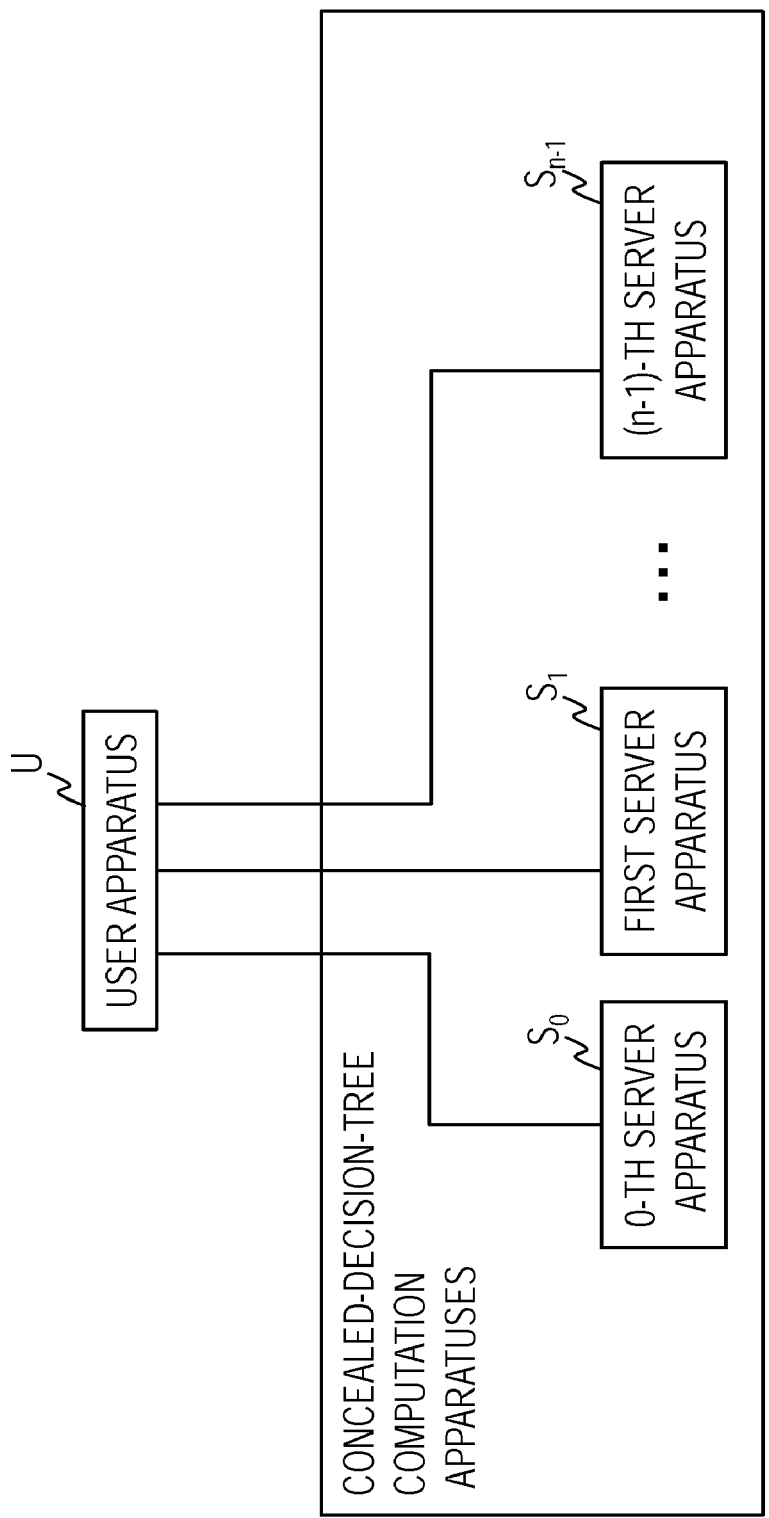
FIG. 1 is a block diagram illustrating an example of a concealed-decision-tree computation apparatus.

First, basic items of the present invention will be described.

Notation

"x←B" indicates that, when B is a set, an element is selected from B uniformly and randomly and is substituted for x; when B is an algorithm, the output of B is substituted for x; and when B is a probability density function, an instance x conforming to the probability density function is sampled.

"Predicate" is a function whose output is {0, 1}. "Predicate $a >_? b$" returns "1" when a>b holds, and otherwise, returns "0".

Decision Tree

A decision tree is defined as a set of (h, M, m, R, L, $\{G_i\}_{i<m-M}$, $\{out_i\}_{m-M \leq i < m}$), where h indicates the (deepest) height, M indicates the number of leaf nodes, and m indicates the total number of nodes. Numbers 0 to m−1 are assigned to the nodes, and numbers m−M to m−1 are assigned to the leaf nodes. "R, $L \cdot Z_m \rightarrow Z_m$" indicates a function that outputs the left or right node of the input node. "R(i)" indicates the child node at the right side of a node i, and "L(i)" indicates the child node at the left side of the node "i". "$G_i$" indicates a predicate corresponding to the node "i". The predicate of each node performs comparison and equality determination only. For example, "$G_i$" is a form like "$<_? b$" and has a conditional expression "$<_?$" and a conditional value "b". To make the notation simple, when the conditional expression of G is "$<_?$", "$>_?$", "$\leq_?$", or "$\geq_?$", $G \in$ Comparison, and the conditional expression of G is "$=_?$", $G \in$ Equality. "$Out_i$" is a value (a recommended value, for example) corresponding to a leaf node "i".

In addition, "path(i)" indicates an algorithm that receives a leaf node i as an input and outputs a set of all nodes passed to reach the leaf node i from a root node 0. LR(i, j) indicates an algorithm that receives the leaf node i and a node $j \in$ path(i) at the middle as inputs and outputs right or left when the node located one layer below the node j is the right child node or the left child node of the node j.

Secret Sharing

Secret sharing indicates a set of the following two algorithms Share and Rec for predetermined numbers (k, n).

Share receives a secret "a" as an input and outputs a share $[a]_0, \ldots, [a]_{n-1}$.

Rec receives a share $[a]_{i\_0}, \ldots, [a]_{i\_K-1}$ as an input and outputs a secret "s", where $K \geq k$, j is an integer, and i_j indicates $i_j$.

As homomorphism, there exist an operation (−) having $b(-)[a]_i = [b-a]_i$, an operation (+) having $[a]_i(+)[b]_i = [a+b]_i$, and an operation (×) having $b(\times)[a]_i = [ab]_i$. These operations (−),(+), and (×) can be implemented with a known method.

Multiplication Protocol

A multiplication protocol Mult receives secret-shared values $[a]_i$ and $[b]_i$ of each server apparatus $S_i$ as inputs and generates a share $[ab]_i$ of a multiplication result for the server apparatus $S_i$. As the multiplication protocol Mult, a protocol described in Reference Literature 1 can be used, for example.

Reference Literature 1: Ivan Damgard and Jesper Buus Nielsen, "Scalable and unconditionally secure multiparty computation", In CRYPTO, pp. 572-590, 2007

Comparison protocol and equality determination protocol with public value

A comparison protocol CompPub with a public value receives a secret-shared value $[a]_i$ for each server apparatus $S_i$ and a predicate $G \in$ Comparison as inputs and generates a share $[G(a)]_i$ of a predicate result for the server apparatus $S_i$. As the comparison protocol CompPub, a protocol described in Reference Literature 2 can be used, for example.

Reference Literature 2: Ivan Damgard, Matthias Fitzi, Eike Kiltz, Jesper Buus Nielsen and Tomas Toft, "Unconditionally secure constant-rounds multi-party computation for equality, comparison, bits and exponentiation", In TCC, pp. 285-304, 2006

The multiplication protocol and homomorphism may be used to form AND, OR, NOT, or another circuit to implement the comparison protocol CompPub.

An equality determination protocol EqPub with a public value receives a secret-shared value $[a]_i$ of each server apparatus $S_i$ and a predicate $G \in$ Equality as inputs and generates a share $[G(a)]_i$ of a predicate result for the server apparatus $S_i$. A protocol described in Reference Literature 2 can be used, for example. The multiplication protocol and homomorphism may be used to form AND, OR, NOT, or another circuit to implement the equality determination protocol EqPub.

Embodiments

A concealed-decision-tree computation system, apparatus, and method according to one embodiment will be described below by referring to the drawings.

The concealed-decision-tree computation system includes, for example, a user apparatus U and a server apparatus group serving as a concealed-decision-tree computation apparatus, as shown in FIG. 1. This server apparatus group is formed, for example, of a 0-th server apparatus $S_0$ to an (n−1)-th server apparatus $S_{n-1}$. Assuming that i=0, . . . , n−1, the server apparatus $S_i$ written above in the basic items of the present invention corresponds to the i-th server apparatus $S_i$. Also in the following description, the i-th server apparatus $S_i$ may be referred to as the server apparatus $S_i$ as an abbreviation.

In this embodiment, a decision tree is computed while keeping the data of the user apparatus U concealed, and the computation result is returned to the user apparatus U.

Figure 2:
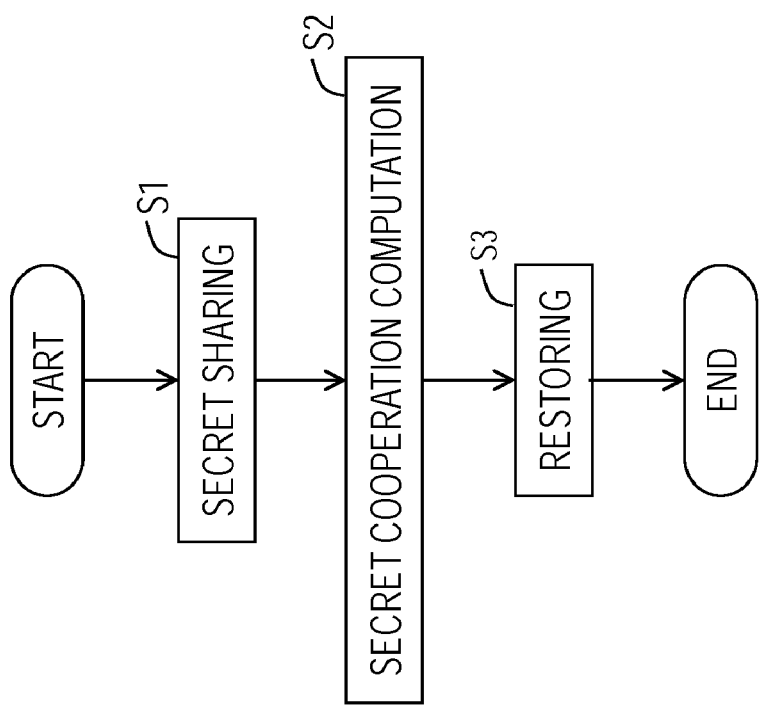
FIG. 2 is a flowchart illustrating an example of a concealed-decision-tree computation method.

The concealed-decision-tree computation method is achieved when each apparatus in the concealed-decision-tree computation system performs processing of each step shown in FIG. 2. A general flow in this embodiment will be described below.

Step S1: The user apparatus U applies secret sharing to its own data to give a share to each server apparatus $S_i$.

Step S2: Each server apparatus $S_i$ uses the secret-shared value and its own decision tree to perform secret cooperation computation to obtain a share of a value (recommended value, for example) corresponding to the data.

Step S3: Each server apparatus $S_i$ sends the share of the value (recommended value, for example) corresponding to the data to the user apparatus U, and the user apparatus U uses the shares to restore the value corresponding to the data.

For simplicity, the data of the user apparatus U is limited to D only. Even when the user apparatus U has a plurality of items of data, the same approach can be used. In other words, the plurality of items of data are respectively secret-shared, and each node refers to an appropriate item of data, if necessary.

Processing to be performed in each step will be described below. FIG. 3 shows an example of a basic decision-tree computation protocol used to implement processing in the steps.

Step S1

According to a predetermined algorithm Share, the user apparatus secret-shares the data D into n shares $[D]_j$ (j= 0, . . . , n−1) and sends the n shares $[D]_j$ (j=0, . . . , n−1) to the 0-th server apparatus to the (n−1)-th server apparatus (step S1), where n is a predetermined positive integer.

The processing in step S1 corresponds to "1:" in the basic decision-tree computation protocol shown in FIG. 3.

Step S2

The 0-th server apparatus $S_0$ to the (n−1)-th server apparatus $S_{n-1}$ use the received n shares $[D]_j$ (j=0, . . . , n−1) to perform secret cooperation computation to obtain n shares $[out]_0, \ldots, [out]_{n-1}$ of a value "out" corresponding to the data D in the predetermined decision tree and send them to the user apparatus U (step S2).

The processing in step S2 corresponds to "2:" to "15:" in the basic decision-tree computation protocol shown in FIG. 3.

Specifically, the 0-th server apparatus $S_0$ to the (n−1)-th server apparatus $S_{n-1}$ use the n shares $[D]_j$ (j=0, . . . , n−1) to perform secret cooperation computation to obtain $flag_i$ corresponding to each leaf node i, which is "1" when the data D satisfies the conditions of all nodes from the root node in the predetermined decision tree to the leaf node i and which is "0" when the data D does not satisfy at least one of the conditions of all the nodes from the root node in the predetermined decision tree to the leaf node i. This processing corresponds to "2:" to "14:" in the basic decision-tree computation protocol shown in FIG. 3.

Then, the 0-th server apparatus $S_0$ to the (n−1)-th server apparatus $S_{n-1}$ perform secret cooperation computation to obtain the sum of products of a value corresponding to each leaf node i in the predetermined decision tree and $flag_i$ and use the computation results as the n shares $[out]_0, \ldots, [out]_{n-1}$ of the value "out" corresponding to the data D in the predetermined decision tree.

Step S3

According to a predetermined algorithm Rec, the user apparatus U uses at least k shares out of the received n shares $[out]_0, \ldots, [out]_{n-1}$ to restore the value "out" corresponding the data D in the predetermined decision tree (step S3), where k is a predetermined integer equal to or smaller than n.

The processing in step S3 corresponds to "16:" in the basic decision-tree computation protocol shown in FIG. 3.

Due to the above-described processing from step S1 to step S3, a recommended result can be returned while the data of the user apparatus and the decision tree of each server apparatus remain concealed, preventing personal information from leaking needlessly.

If secret computation is used only for each step of a usual decision-tree computation, the server understands which path was used in the decision tree, which may allow the server to recognize partial information of personal data.

In contrast, according to the above-described embodiment, "flag" is computed for each of all leaf nodes, which is "1" when the data of the user apparatus reaches the node and "0" when the data does not reach the node, and the sum of products of the "flag" and the recommended result is obtained to generate shares of the final value. In this method, even when personal information uses any path in the decision tree, the processing in the server apparatus is not changed, preventing information on the data of the user apparatus from leaking to the server apparatus.

Program and Recording Medium

The processing described in the concealed-decision-tree computation system, apparatus, and method may be executed not only time sequentially according to the order of description but also in parallel or individually as necessary or according to the processing capabilities of the apparatuses that execute the processing.

When each processing in the concealed-decision-tree computation apparatus is implemented by a computer, the processing details of the functions that should be provided by the concealed-decision-tree computation apparatus are described in a program. When the program is executed by a computer, each processing is implemented on the computer.

The program containing the processing details can be recorded in a computer-readable recording medium. The computer-readable recording medium can be any type of medium, such as a magnetic recording device, an optical disc, a magneto-optical recording medium, or a semiconductor memory.

Each processing unit may be implemented by executing the predetermined program on the computer, but at least a part of the processing details may be implemented by hardware.

Modifications

It is needless to say that appropriate changes can be made to the above embodiment without departing from the scope of the present invention.

What is claimed is:

1. A concealed-decision-tree computation system comprising a user apparatus and 0th to (n−1)-th server apparatuses, where n is a predetermined positive integer of 2 or more, the user apparatus secret-sharing data D into n shares $[D]_j$ (j=0, . . . , n−1) and sending the n shares $[D]_j$ (j=0, . . . , n−1) to the 0th to (n−1)-th server apparatuses over a network while keeping the original data D concealed from each of the 0th to (n−1)-th server apparatuses, respectively, the 0th to (n−1)-th server apparatuses using the n shares $[D]_j$ (j=0, . . . , n−1) to perform secret cooperation computation to obtain n shares $[out]_0, \ldots, [out]_{n-1}$ of a value "out" corresponding to the data D in a predetermined decision tree and sending the n shares $[out]_0, \ldots, [out]_{n-1}$ to the user apparatus while keeping the predetermined decision tree concealed from the user apparatus, the user apparatus using at least k shares out of the n received shares $[out]_0, \ldots, [out]_{n-1}$ to restore the value "out" corresponding to the data D in the predetermined decision tree, where k is a predetermined integer equal to or smaller than n, wherein the 0-th to (n−1)-th server apparatuses use the n shares $[D]_j$ (j=0, . . . , n−1) to perform secret cooperation computation to obtain $flag_i$ corresponding to each leaf node i of the predetermined decision tree, $flag_i$ being "1" when the data D satisfies the conditions of all nodes from the root node in the predetermined decision tree to the leaf node i, and $flag_i$ being "0" when the data D does not satisfy at least one of the conditions of all the nodes from the root node in the predetermined decision tree to the leaf node i; and the 0-th to (n−1)-th server apparatuses perform secret cooperation computation to obtain the sum of products of a value corresponding to each leaf node i in the predetermined decision tree and $flag_i$ and use the computation results as the n shares $[out]_0, \ldots, [out]_{n-1}$ of the value "out" corresponding to the data D in the predetermined decision tree.

2. A concealed-decision-tree computation apparatus comprising 0-th to (n−1)-th server apparatuses of a concealed-decision-tree system, wherein the concealed-decision-tree computation system comprising a user apparatus and the 0th to (n−1)-th server apparatuses, where n is a predetermined positive integer of 2 or more, the user apparatus secret-sharing data D into n shares $[D]_j$ (j=0, . . . , n−1) and sending the n shares $[D]_j$ (j=0, . . . , n−1) to the 0th to (n−1)-th server apparatuses over a network while keeping the original data D concealed from each of the 0th to (n−1)-th server apparatuses, respectively, the 0th to (n−1)-th server apparatuses using the n shares $[D]_j$ (j=0, . . . , n−1) to perform secret cooperation computation to obtain n shares $[out]_0, \ldots, [out]_{n-1}$ of a value "out" corresponding to the data D in a predetermined decision tree and sending the n shares $[out]_0, \ldots, [out]_{n-1}$ to the user apparatus while keeping the predetermined decision tree concealed from the user apparatus, the user apparatus using at least k shares out of the n received shares $[out]_0, \ldots, [out]_{n-1}$ to restore the value "out" corresponding to the data D in the predetermined decision tree, where k is a predetermined integer equal to or smaller than n, wherein the 0-th to (n−1)-th server apparatuses use the n shares $[D]_j$ (j=0, ..., n−1) to perform secret cooperation computation to obtain $\text{flag}_i$ corresponding to each leaf node i of the predetermined decision tree, $\text{flag}_i$ being "1" when the data D satisfies the conditions of all nodes from the root node in the predetermined decision tree to the leaf node i, and $\text{flag}_i$ being "0" when the data D does not satisfy at least one of the conditions of all the nodes from the root node in the predetermined decision tree to the leaf node i; and the 0-th to (n−1)-th server apparatuses perform secret cooperation computation to obtain the sum of products of a value corresponding to each leaf node i in the predetermined decision tree and $\text{flag}_i$ and use the computation results as the n shares $[\text{out}]_0, \ldots, [\text{out}]_{n-1}$ of the value "out" corresponding to the data D in the predetermined decision tree.

3. A concealed-decision-tree computation method comprising:

a step of secret-sharing data D into n shares $[D]_j$ (j=0, ..., n−1) and sending the n shares $[D]_j$ (j=0, ..., n−1) to 0th to (n−1)-th server apparatuses over a network while keeping the original data D concealed from each of the 0th to (n−1)-th server apparatuses, respectively, where n is a predetermined positive integer of 2 or more, the step being performed by a user apparatus;

a step of using the n shares $[D]_j$ (j=0, ..., n−1) to perform secret cooperation computation to obtain n shares $[\text{out}]_0, \ldots, [\text{out}]_{n-1}$ of a value "out" corresponding to the data D in a predetermined decision tree and sending the n shares $[\text{out}]_0, \ldots, [\text{out}]_{n-1}$ to the user apparatus while keeping the predetermined decision tree concealed from the user apparatus, the step being performed by the 0th to (n−1)-th server apparatuses; and a step of using at least k shares out of the n received shares $[\text{out}]_0, \ldots, [\text{out}]_{n-1}$ to restore the value "out" corresponding to the data D in the predetermined decision tree, where k is a predetermined integer equal to or smaller than n, the step being performed by the user apparatus, wherein the 0-th to (n−1)-th server apparatuses use the n shares $[D]_j$ (j=0, ..., n−1) to perform secret cooperation computation to obtain $\text{flag}_i$ corresponding to each leaf node i of the predetermined decision tree, $\text{flag}_i$ being "1" when the data D satisfies the conditions of all nodes from the root node in the predetermined decision tree to the leaf node i, and $\text{flag}_i$ being "0" when the data D does not satisfy at least one of the conditions of all the nodes from the root node in the predetermined decision tree to the leaf node i; and the 0-th to (n−1)-th server apparatuses perform secret cooperation computation to obtain the sum of products of a value corresponding to each leaf node i in the predetermined decision tree and $\text{flag}_i$ and use the computation results as the n shares $[\text{out}]_0, \ldots, [\text{out}]_{n-1}$ of the value "out" corresponding to the data D in the predetermined decision tree.

4. A non-transitory computer readable medium that stores a program for causing a computer to serve as a concealed-decision-tree computation apparatus comprising:

0-th to (n−1)-th server apparatuses of a concealed-decision-tree system, wherein the concealed-decision-tree computation system comprising a user apparatus and the 0th to (n−1)-th server apparatuses, where n is a predetermined positive integer of 2 or more, the user apparatus secret-sharing data D into n shares $[D]_j$ (j=0, ..., n−1) and sending the n shares $[D]_j$ (j=0, ..., n−1) to the 0th to (n−1)-th server apparatuses over a network while keeping the original data D concealed from each of the 0th to (n−1)-th server apparatuses, respectively, the 0th to (n−1)-th server apparatuses using the n shares $[D]_j$ (j=0, ..., n−1) to perform secret cooperation computation to obtain n shares $[\text{out}]_0, \ldots, [\text{out}]_{n-1}$ of a value "out" corresponding to the data D in a predetermined decision tree and sending the n shares $[\text{out}]_0, \ldots, [\text{out}]_{n-1}$ to the user apparatus while keeping the predetermined decision tree concealed from the user apparatus, the user apparatus using at least k shares out of the n received shares $[\text{out}]_0, \ldots, [\text{out}]_{n-1}$ to restore the value "out" corresponding to the data D in the predetermined decision tree, where k is a predetermined integer equal to or smaller than n, wherein the 0-th to (n−1)-th server apparatuses use the n shares $[D]_j$ (j=0, ..., n−1) to perform secret cooperation computation to obtain $\text{flag}_i$ corresponding to each leaf node i of the predetermined decision tree, $\text{flag}_i$ being "1" when the data D satisfies the conditions of all nodes from the root node in the predetermined decision tree to the leaf node i, and $\text{flag}_i$ being "0" when the data D does not satisfy at least one of the conditions of all the nodes from the root node in the predetermined decision tree to the leaf node i; and the 0-th to (n−1)-th server apparatuses perform secret cooperation computation to obtain the sum of products of a value corresponding to each leaf node i in the predetermined decision tree and $\text{flag}_i$ and use the computation results as the n shares $[\text{out}]_0, \ldots, [\text{out}]_{n-1}$ of the value "out" corresponding to the data D in the predetermined decision tree.

* * * * *